United States Patent
Shimokawa et al.

(10) Patent No.: US 11,024,342 B2
(45) Date of Patent: Jun. 1, 2021

(54) DIGITAL IMAGE PROCESSING APPARATUS AND METHOD OF CONTROLLING THE SAME

(71) Applicant: SAMSUNG ELECTRONICS CO., LTD., Suwon-si (KR)

(72) Inventors: Shuichi Shimokawa, Suwon-si (KR); Na-young Kim, Seongnam-si (KR); In-ra Jang, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 17 days.

(21) Appl. No.: 16/710,310

(22) Filed: Dec. 11, 2019

(65) Prior Publication Data

US 2020/0118598 A1    Apr. 16, 2020

Related U.S. Application Data

(63) Continuation of application No. 16/110,395, filed on Aug. 23, 2018, now Pat. No. 10,546,615, which is a (Continued)

(30) Foreign Application Priority Data

Jan. 17, 2012    (KR) .................... 10-2012-0005276

(51) Int. Cl.
    *H04N 5/232*    (2006.01)
    *G11B 27/34*    (2006.01)
    (Continued)

(52) U.S. Cl.
    CPC .............. *G11B 27/34* (2013.01); *G11B 27/10* (2013.01); *G11B 27/28* (2013.01);
    (Continued)

(58) Field of Classification Search
    CPC ................................................. H04N 5/23245
    (Continued)

(56) References Cited

U.S. PATENT DOCUMENTS

| 2002/0197067 A1* | 12/2002 | Ohnishi | ............... G11B 27/34 386/230 |
| 2003/0052986 A1 | 3/2003 | Matsumoto | |

(Continued)

FOREIGN PATENT DOCUMENTS

| CN | 102006416 A | 4/2011 |
| JP | 2010-147861 A | 7/2010 |
| JP | 2011-071968 A | 4/2011 |

OTHER PUBLICATIONS

Office Action issued for related application CN 20130017483.1, dated Dec. 26, 2016, with English language translation, 21 pages.
Extended European Search Report issued for related application EP 13151529.8, dated Dec. 20, 2013, 9 pages.
(Continued)

*Primary Examiner* — Joel W Fosselman
(74) *Attorney, Agent, or Firm* — Faegre Drinker Biddle & Reath LLP

(57) ABSTRACT

A digital image processing apparatus and a method of controlling the same. The digital image processing apparatus includes: a display controller for displaying first content on a display unit; and an image generator for generating second content based on a photographing signal input, which may be from a user, and third content related to the second content.

13 Claims, 12 Drawing Sheets

Related U.S. Application Data continuation of application No. 14/874,976, filed on Oct. 5, 2015, now Pat. No. 10,079,041, which is a continuation of application No. 13/739,275, filed on Jan. 11, 2013, now Pat. No. 9,167,163.

(51) Int. Cl.
  *G11B 27/10* (2006.01)
  *G11B 27/28* (2006.01)
  *H04N 5/45* (2011.01)
  *H04N 1/21* (2006.01)

(52) U.S. Cl.
  CPC ..... *H04N 5/23245* (2013.01); *H04N 5/23293* (2013.01); *H04N 5/232939* (2018.08); *H04N 1/212* (2013.01); *H04N 5/45* (2013.01)

(58) Field of Classification Search
  USPC ........................................................ 348/241
  See application file for complete search history.

(56) References Cited

U.S. PATENT DOCUMENTS

| | | |
|---|---|---|
| 2005/0044489 A1 | 2/2005 | Yamagami et al. |
| 2009/0282362 A1 | 11/2009 | Matsumoto |
| 2010/0054692 A1 | 3/2010 | Naruse et al. |
| 2011/0055296 A1 | 3/2011 | Shimazaki et al. |
| 2011/0102616 A1 | 5/2011 | Migiyama et al. |

OTHER PUBLICATIONS

Examination Report issued for related application EP 13151529.8, dated Nov. 17, 2015, 6 pages.
Decision to Refuse issued for related application EP 13151529.8, dated Dec. 22, 2017, with English language translation, 17 pages.
Office Action issued for related application KR 10-2012-0005276, dated Aug. 10, 2017, with English language translation, 12 pages.
Notice of Allowance issued for related application KR 10-2012-0005276, dated Oct. 12, 2017, with English language translation, 3 pages.

\* cited by examiner

SHUTTER RELEASE BUTTON

IMAGE PICKUP DEVICE AND MOVING IMAGE CAPTURE OPERATION

DUAL CAPTURE OPERATION

MOVING IMAGE HIGHLIGHT CAPTURE OPERATION

DIGITAL IMAGE PROCESSING APPARATUS AND METHOD OF CONTROLLING THE SAME

CROSS-REFERENCE TO RELATED PATENT APPLICATIONS

This application is a continuation of U.S. patent application Ser. No. 16/110,395, filed Aug. 23, 2018, which is a continuation of U.S. patent application Ser. No. 14/874,976, filed Oct. 5, 2015, now U.S. Pat. No. 10,079,041, which is a continuation of U.S. patent application Ser. No. 13/739,275, filed Jan. 11, 2013, now U.S. Pat. No. 9,167,163, which claims the benefit of Korean Patent Application No. 10-2012-0005276, filed on Jan. 17, 2012, in the Korean Intellectual Property Office, the disclosures of which are incorporated herein in their entirety by reference.

BACKGROUND

Disclosed herein are a digital image processing apparatus and a method of controlling the same.

Digital image processing apparatuses, such as digital cameras and camcorders, have become portable due, in part, to the miniaturization and development of batteries, etc., and thus images are easily captured anywhere. In addition, the digital image processing apparatuses provide various functions for a user to capture a high quality image, even if the user is not an expert.

Also, the digital image processing apparatuses provide various functions for editing an image while capturing the image or after capturing the image so that the user may generate an image having a desired form.

SUMMARY

One or more embodiments of the invention provide a digital image processing apparatus capable of variously manufacturing additional content related to a moving image, and a method of controlling the digital image processing apparatus.

According to an embodiment of the invention, there is provided a digital image processing apparatus including: a display controller for displaying first content on a display unit; and an image generator for generating second content based on a photographing signal input, which may be input from a user, and third content related to the second content.

The third content may be a moving image generated for a predetermined time based on a point of time when the photographing signal is applied.

The predetermined time may include an interval before the point of time when the photographing signal is applied.

The third content may include a pointer indicating a start time and an end time of the first content.

Final generation of the third content may be determined when displaying of the first content is ended.

The first content may be a moving image captured in real-time.

The first content may be a stored moving image.

Resolution of the third content may be below or equal to resolution of the second content.

The display controller may simultaneously reproduce the third content while reproducing the second content.

When the second content is reproduced, the display controller may first reproduce the third content, and reproduce the second content after reproducing of the third content is ended.

According to another embodiment of the invention, there is provided a method of controlling a digital image processing apparatus, the method including: displaying first content; generating second content based on a photographing signal input, which may be input from a user; and generating third content related to the second content.

The generating of the third content may include generating a moving image for a predetermined time based on a point of time when the second content is generated.

The predetermined time may include an interval before a point of time when the photographing signal is applied.

The generating of the third content may include generating the third content such that the third content includes a pointer indicating a start time and an end time of the first content.

The method may further include determining final generation of the generated third content.

The first content may be a moving image.

Resolution of the third content may be below or equal to resolution of the second content.

According to another embodiment of the invention, there is provided a method of controlling a digital image processing apparatus storing second content generated from first content constituting a moving image, and third content related to the second content, the method including reproducing one of the second and third contents selected by a user.

The third content may be simultaneously reproduced while reproducing the second content.

The reproducing may include, when the second content is reproduced, first reproducing the third content and then reproducing the second content after the reproducing of the third content is ended.

The second content may be a still image and the third content may be a moving image.

BRIEF DESCRIPTION OF THE DRAWINGS

The above and other features and advantages of the invention will become more apparent by describing in detail exemplary embodiments thereof with reference to the attached drawings in which.

DETAILED DESCRIPTION

Figure 1:
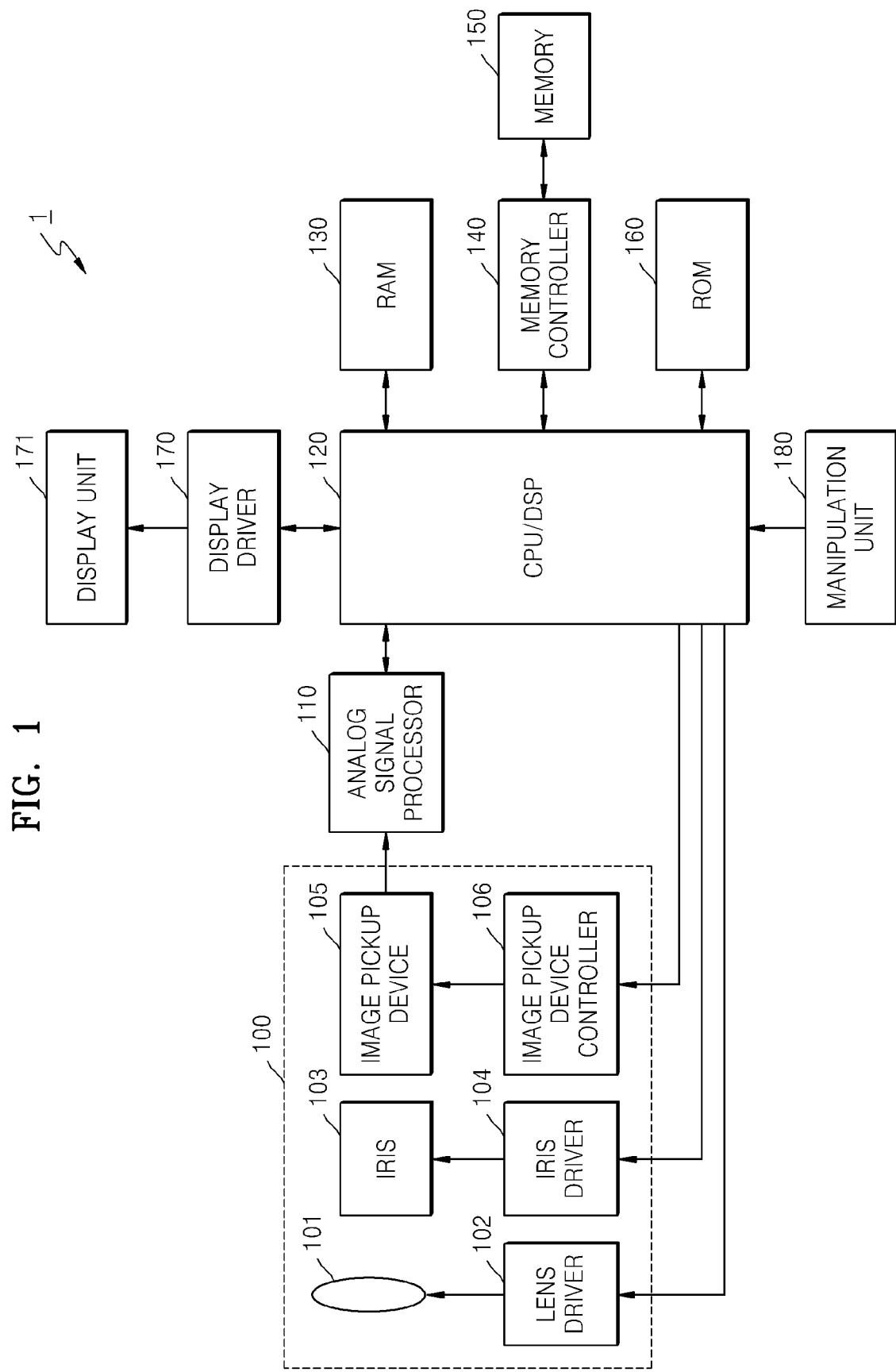
FIG. 1 is a block diagram of a digital image processing apparatus according to an embodiment of the invention.

As the invention allows for various changes and numerous embodiments, particular embodiments will be illustrated in the drawings and described in detail in the written description. However, this is not intended to limit the invention to particular modes of practice, and it will be appreciated that all changes, equivalents, and substitutes that do not depart from the spirit and technical scope of the invention are encompassed in the invention. In the description of the invention, certain detailed explanations of related art are omitted when it is deemed that they may unnecessarily obscure the essence of the invention.

The terms used in the present specification are merely used to describe particular embodiments, and are not intended to limit the invention. An expression used in the singular encompasses the expression of the plural, unless it has a clearly different meaning in the context. In the present specification, it is to be understood that the terms such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

Those components that are the same or are in correspondence are rendered the same reference numeral regardless of the figure number, and redundant explanations are omitted.

FIG. 1 is a block diagram of a digital image processing apparatus 1 according to an embodiment of the invention.

Referring to FIG. 1, the digital image processing apparatus 1 may include a photographing unit 100, an analog signal processor 110, a central processing unit/digital signal processor (CPU/DSP) 120, a random access memory (RAM) 130, a memory controller 140, a memory 150, a read-only memory (ROM) 160, a display driver 170, a display unit 171, and a manipulation unit 180.

Overall operations of the digital image processing apparatus 1 are controlled by the CPU/DSP 120. The CPU/DSP 120 provides a control signal for operating each element to a lens driver 102, an iris driver 104, an image pickup device controller 106, or the like. In the current embodiment, a CPU performing a control function and a DSP performing a signal process are configured as one device, but alternatively, the CPU and the DSP may be configured as individual devices.

The photographing unit 100 is an element for generating an image of an electric signal from an incident light. The photographing unit 100 may include a lens 101, the lens driver 102, an iris 103, the iris driver 104, an image pickup device 105, the image pickup device controller 106, etc.

The lens 101 may include a plurality of groups of lenses or a plurality of lenses. A location of the lens 101 may be adjusted by the lens driver 102. The lens driver 102 adjusts the location of the lens 101 according to a control signal provided by the CPU/DSP 120.

An opening/closing degree of the iris 103 is adjusted by the iris driver 104, and the iris 103 adjusts an amount of light incident on the image pickup device 105. The iris driver 104 drives the iris 103 according to a control signal provided by the CPU/DSP 102.

The image pickup device 105 generates an image signal by capturing an image light of a subject, which has passed through the lens 101 and the iris 103. The image pickup device 105 may include a plurality of photoelectric conversion devices arranged in a matrix form, a charge transmission path for transferring a charge from the photoelectric conversion device, etc. The image pickup device 105 may be a charge coupled device (CCD) image sensor or a complementary metal oxide semiconductor (CIS) image sensor.

Sensitivity or the like of the image pickup device 105 may be adjusted by the image pickup device controller 106. The image pickup device controller 106 may control the image pickup device 105 according to a control signal automatically generated by an image signal input in real-time, or a control signal manually input by a user.

An exposure time of the image pickup device 105 is adjusted by a shutter (not shown). Examples of the shutter include a mechanical shutter that adjusts incidence of light by moving a mask, and an electronic shutter that adjusts exposure by providing an electric signal to the image pickup device 105.

The image pickup device controller 106 generates and applies a timing signal to the image pickup device 105, and thus controls an imaging operation of the image pickup device 105. Also, the image pickup device controller 106 controls the image pickup device 105 to sequentially read image signals when accumulation of charges in each scan line of the image pickup device 105 is completed.

The analog signal processor 110 performs a noise reduction process, gain adjustment, waveform standardization, an analog-to-digital conversion process, or the like on an analog image signal supplied from the image pickup device 105. A signal processed by the analog signal processor 110 may be input to the CPU/DSP 120 through or not through the RAM 130.

The RAM 130 operates as a main memory of the digital image processing apparatus 1, and temporarily stores information required while operating the CPU/DSP 120. The ROM 160 stores a program, such as an operation system or an application system, for operating the digital image processing apparatus 1.

The memory controller 140 controls input and output of data to the memory 150. The memory 150 may store a file, such as a still image or a moving image. The memory 150 may separately store a dual capture image constituting second content generated with respect to a main moving image constituting first content, and a moving image highlight constituting third content generated with the dual capture image. In addition, the memory 150 may store metadata about related information between the primary through third contents in a separate file.

The display driver 170 controls an image output to the display unit 171.

The display unit 171 may display a live view image captured in real-time, a quick view image temporarily displayed after image capture, a reproduction image of stored images, or the like. Also, the display unit 171 may display various pieces of setup information.

The display unit 171 and the display driver 170 may be respectively a liquid crystal display (LCD) and an LCD driver. Alternatively, the display unit 171 and the display driver 170 may be respectively an organic light emitting display (OLED) and an OLED driver. Also, a touch screen for recognizing a touch input may be provided to the display unit 171, as the manipulation unit 180.

The manipulation unit 180 is a unit for generating a control signal by receiving various commands from the user to manipulate the digital image processing apparatus 1. The manipulation unit 180 may include various input keys, such as a power supply button, a shutter release button, a zoom button, a mode dial, a menu button, a four-way button, and a jog dial. Also, the manipulation unit 180 may include a touch screen that detects contact of a body part of the user and generates a command according to the contact.

The CPU/DSP 120 processes an input image signal, and controls each element according to the processed input image signal or an external input signal. The CPU/DSP 120 will be described in detail below with reference to FIGS. 2 and 3.

Figure 2:
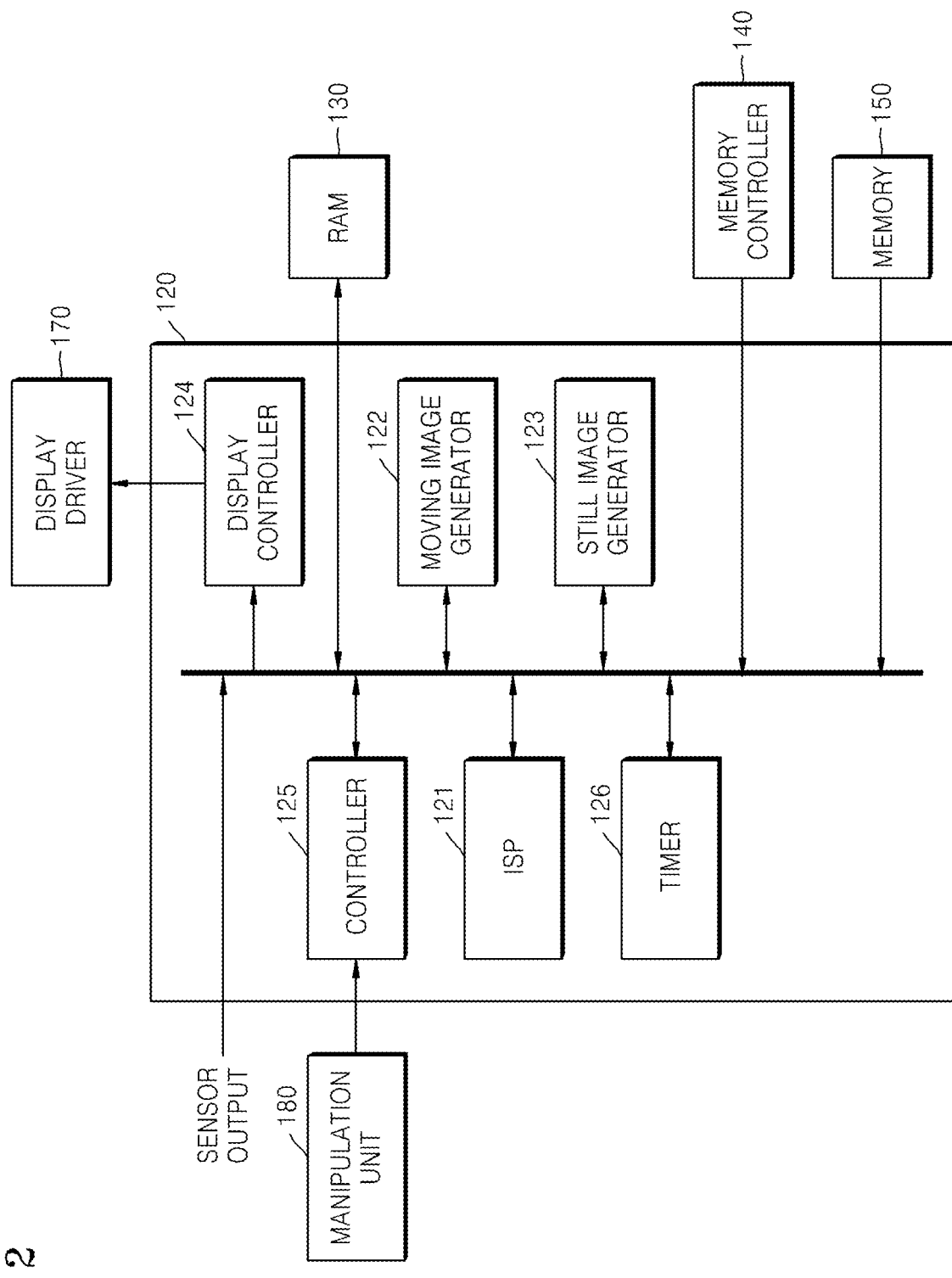
FIG. 2 is a block diagram of a central processing unit/digital signal processor (CPU/DSP) according to an embodiment of the invention.

FIG. 2 is a block diagram of the CPU/DSP 120 according to an embodiment of the invention.

Referring to FIG. 2, the CPU/DSP 120 may include an image signal processor (ISP) 121, a moving image generator 122, a still image generator 123, a display controller 124, a controller 125, and a timer 126.

The ISP 121 reduces noise in input image data, and may perform image signal processes for improving image quality, such as gamma correction, color filter array interpolation, color matrix processing, color correction, and color enhancement.

The ISP 121 may further perform a noise reduction process, a color process, a blur process, an edge enhancement process, an image interpretation process, an image recognition process, and an image effect process. Examples of the image recognition process include a face recognition process and a scene recognition process. In addition, the ISP 121 may perform a display image signal process for displaying an image on the display unit 171. For example, the ISP 121 may perform luminance level adjustment, color correction, contrast adjustment, outline enhancement adjustment, a screen division process, character image generation, and an image composition process.

The digital image processing apparatus 1 may be connected to an external monitor, and the ISP 121 may perform a predetermined image signal process such that an image is displayed on the external monitor. Processed image data is transmitted to the external monitor, and a corresponding image may be displayed on the external monitor.

The moving image generator 122 may generate a file of a moving image by performing an image signal process for improving image quality and compressing generated image data. Also, the moving image generator 122 may restore moving image data from the file of the moving image. An image may be compressed in a lossey or lossless manner.

Similarly, the still image generator 123 may generate a file of a still image by performing an image signal process for improving image quality, and compressing generated image data. Also, the still image generator 123 may restore still image data from the file of the still image. An image may be compressed in a lossey or lossless manner.

For example, a still image may be converted to a Joint Photographic Experts Group (JPEG) format or a JPEG 200 format. Also, when a moving image is recorded, a file of a moving image may be generated by compressing a plurality of frames according to the Moving Picture Experts Group (MPEG) standard. An image file may be generated according to the Exchangeable image file format (Exif) standard.

In the current embodiment, the moving image generator 122 and the still image generator 123 are configured as individual units, but alternatively, they may be configured as one unit, and may perform a suitable operation according to a type of input image.

The display controller 124 controls the display driver 170 to control an image display on the display unit 171. For example, the display controller 124 may control the display driver 170 such that a moving image that is being captured or a moving image stored in the memory 150 is displayed on the display unit 171. Also, while a still image is being reproduced, the display controller 124 may control reproducing of a related moving image highlight.

The controller 125 controls each element in the CPU/DSP 120. The controller 125 may execute a program stored in the ROM 160, or may generate a control signal for controlling auto focusing, zoom change, focus change, or automatic exposure correction by including a separate module. The controller 125 provides the generated control signal to the lens driver 102, the iris driver 104, and the image pickup device controller 106, and may control overall operations of elements included in the digital image processing apparatus, such as a shutter and a strobe.

Also, the controller 125 may control each element such that the element performs an operation according to a signal applied via manipulation of the manipulation unit 180.

The timer 126 provides time information. The time information provided by the timer 126 may be inserted into a header region of a file generated by the moving image generator 122 or the still image generator 123. Also, the time information may be used as a pointer for indicating when a dual capture image is captured from a main moving image. Similarly, the time information may be used as a start pointer and an end pointer for indicating when a moving image highlight is generated with respect to a time interval of a main moving image.

Image data output from the ISP 121 is input to the memory controller 140 directly or through the RAM 130. The memory controller 140 stores the image data in the memory 150 automatically or according to a signal from the user. Also, the memory controller 140 reads data about an image from an image file stored in the memory 150, and inputs the read data to the display driver 170 through the RAM 130 and the display controller 124 or through another path so that an image is displayed on the display unit 171. The memory 150 may be detachable or permanently installed in the digital image processing apparatus 1.

Figure 3:
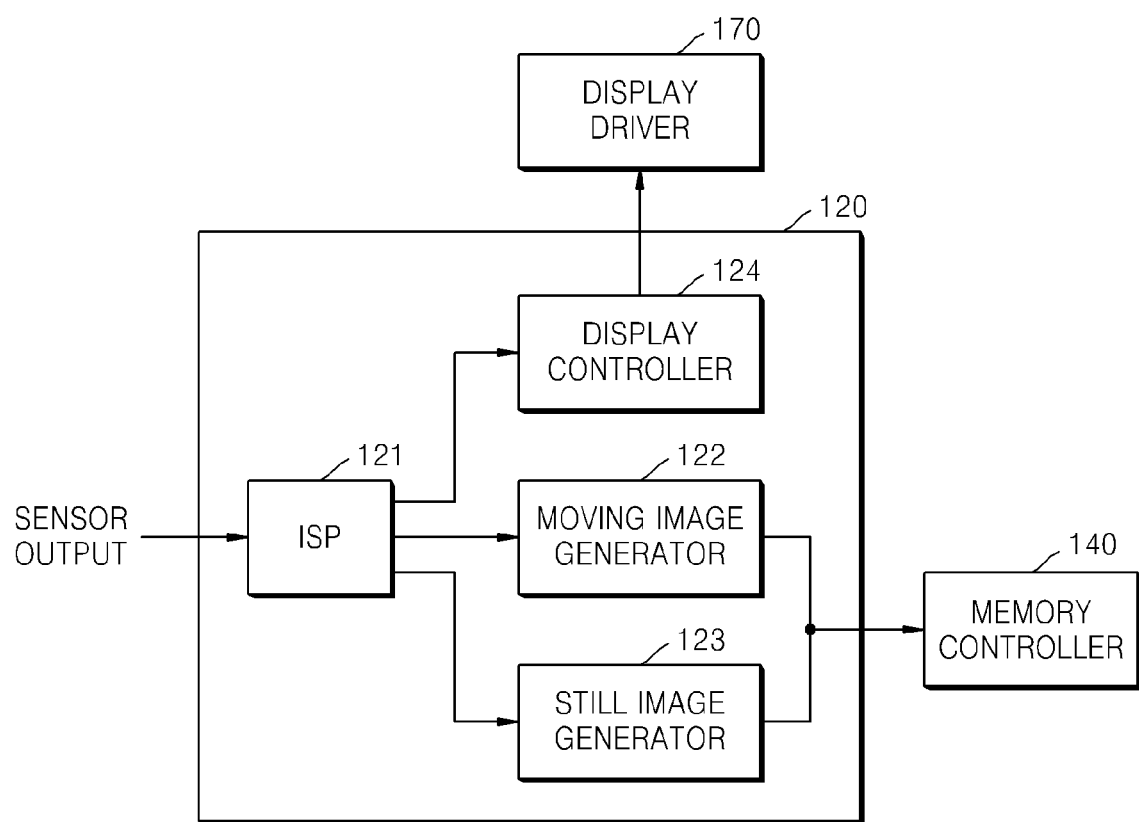
FIG. 3 is a block diagram for describing an image processing operation in the CPU/DSP of FIG. 2.

FIG. 3 is a block diagram for describing an image processing operation in the CPU/DSP 120 of FIG. 2. Only elements required for describing the image processing operation are shown in FIG. 3.

Before describing FIG. 3, contents generated by the digital image processing apparatus 1, according to embodiments of the invention will be described.

The digital image processing apparatus 1 may generate a file of a moving image by capturing a moving image according to a moving image capturing mode from among capturing modes. When the user applies a capture signal for capturing a still image at a predetermined point of time while capturing a moving image, a still image is generated separately from the moving image. In other words, a dual capture image is generated as second content with respect to a main moving image constituting first content. Also, when the capture signal is applied to generate a dual capture image, the digital image processing apparatus 1 separately generates a moving image during a predetermined time interval based on a point of time when the capture signal is applied. Such a moving image is a moving image highlight constituting third content related to the second content.

The digital image processing apparatus 1 may reproduce a moving image already captured and stored. As described above, a dual capture image constituting second content and a moving image highlight constituting third content may be generated with respect to the reproduced moving image.

Generating of the main moving image, the dual capture image, and the moving image highlight described above will now be described in detail.

Referring to FIG. 3, a sensor output is input to the ISP 121 of the CPU/DSP 120. Here, the sensor output is an image signal which is output from the image pickup device 105 and on which various signal processes and conversion to a digital signal are performed by the analog signal processor 110.

As described above, the ISP 121 performs various image signal processes. Also, the ISP 121 performs scale down on the sensor output to ensure the sensor output is a standard size.

Figure 4:
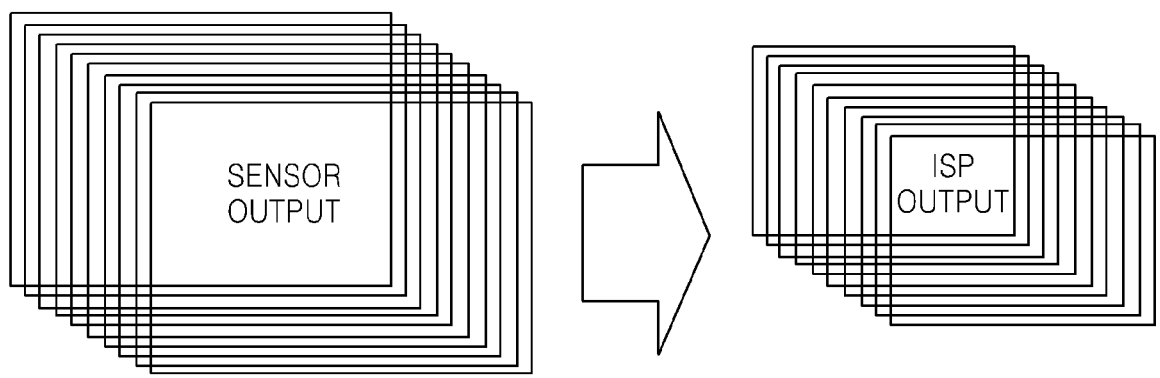
FIG. 4 is a block diagram for describing a relationship between input and output images of an image signal processor, according to an embodiment of the invention.

FIG. 4 is a diagram for describing a relationship between input and output images of the ISP 121, according to an embodiment of the invention. An ISP output that is output from the ISP 121 is smaller than the sensor output. An image signal output from the image pickup device 105 is an actual file, and thus is larger in size than a stored moving image. Accordingly, the ISP 121 scales-down the sensor output to a standard size. The standard size may be full high definition (HD), HD, or standard definition (SD).

Meanwhile, a dual capture image may be generated according to control of the user, for example, as the user presses a shutter release button. Here, the dual capture image is a still image. A size of the dual capture image may be the same as the size of the sensor output according to a setting. Accordingly, the ISP 121 temporarily stores the sensor output on which scale down is not performed, and may use the stored sensor output when a dual capture image needs to be generated. The ISP 121 may include a buffer memory for storing the sensor output. Alternatively, the sensor output may be temporarily stored in the RAM 130.

The ISP output that is processed and output by the ISP 121 is transmitted to the moving image generator 122. The moving image generator 122 generates a moving image stream by using the ISP output received as a Codec, and generates a file of a moving image by using the generated moving image stream. Here, the generated file of the moving image is a main moving image constituting first content.

Also, when a shutter release button is pressed, i.e., when a dual capture command is applied, the ISP 121 transmits the sensor output in full size that is stored in the buffer memory or the like to the still image generator 123. Of course, the sensor output in the full size transmitted to the still image generator 123 is also an image signal on which various image signal processes are performed by the ISP 121.

The still image generator 123 generates a file of a still image by using the ISP output received as a Codec. Here, the generated file of the still image is a dual capture image constituting second content.

In addition, when the dual capture command is applied, the moving image generator 122 according to the current embodiment generates a separate file of a moving image during a predetermined time interval based on a point of time when the dual capture command is applied. In other words, the moving image generator 122 generates a moving image highlight constituting third content.

Here, the moving image highlight may be generated while capturing the main moving image. If the predetermined time interval includes an interval before the point of time when the dual capture command is applied, the ISP 121 or the moving image generator 122 may include a buffer memory for storing the ISP output for a predetermined time. Accordingly, a frame image before the point of time when the dual capture command is applied may be included in the moving image highlight.

Alternatively, the moving image highlight may be generated when capturing of the main moving image is ended. The moving image highlight may be generated by extracting a required region from the main moving image by using time information on the predetermined time interval. In this case, a separate buffer memory may not be required even if the predetermined time interval includes the interval before the point of time when the dual capture command is applied.

The generated moving image highlight may be finally determined in terms of whether to be generated as a file when the capturing of the main moving image is ended. If the user determines that the moving image highlight is not required, the generated moving image highlight may be deleted. Alternatively, if the user determines that the moving image highlight is required, the moving image highlight is finally generated and stored as a file of a moving image.

In order to display an image being captured on the display unit 171, the ISP 121 may transmit the ISP output to the display controller 124.

The display controller 124 transmits the ISP output to the display driver 170, and the display driver 170 may display the ISP output on the display unit 171.

Figure 5:
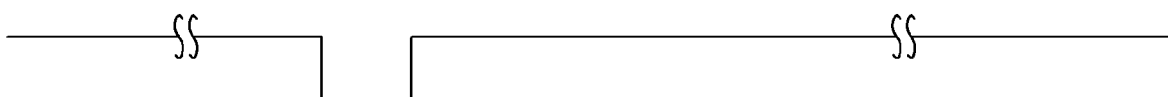
FIG. 5 is a timing diagram for describing a method of generating content, according to an embodiment of the invention.
Figure 5:
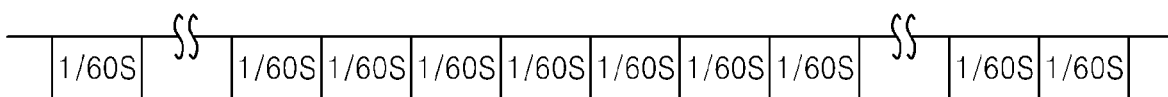
Figure 5:
Figure 5:
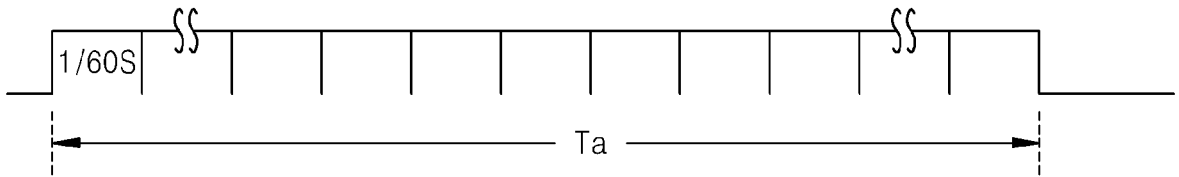

FIG. 5 is a timing diagram for describing a method of generating content, according to an embodiment of the invention. In FIG. 5, a moving image capture operation is started as a shutter release button is pressed in a moving image capturing mode.

Referring to FIG. 5, the image pickup device 105 and the moving image generator 122 capture a frame image in a predetermined period, for example, in a 1/60 seconds interval, according to the moving image capture operation. A moving image stream is generated by using the captured frame image, and when the moving image capture operation is ended, a file of a main moving image is generated by using the moving image stream.

When a shutter release button is pressed at a predetermined point of time, a dual capture image is generated. The dual capture image is a still image, and a size of a sensor output may be used as it is. In other words, the dual capture image may have higher resolution than a main moving image or a moving image highlight. Accordingly, the sensor output, which is temporarily stored in the ISP 121 and on which scale down is not performed, is used as the dual capture image.

Here, in order to classify a dual capture command from a main moving image capture start and end command, for example, the dual capture command may be performed by half-pressing the shutter release button, and the main moving image capture start and end command may be performed by fully pressing the shutter release button. In the current embodiment, only the shutter release button is used, but alternatively, the dual capture command and the main moving image capture start and end command may be performed by using different buttons.

Also, an operation for capturing a moving image highlight is performed by using the dual capture command. In the current embodiment, the moving image highlight includes a predetermined time interval Ta before and after the point of time when the dual capture command is applied. The time interval Ta may be pre-determined, or set or changed by the user.

As such, not only the dual capture image constituting a still image, but also the moving image highlight related to the dual capture image are generated according to the dual capture command while capturing a moving image.

Figure 6:
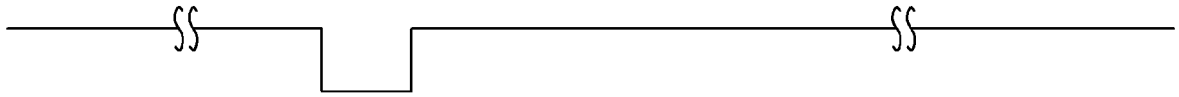
FIG. 6 is a timing diagram for describing a method of generating content, according to another embodiment of the invention.
Figure 6:
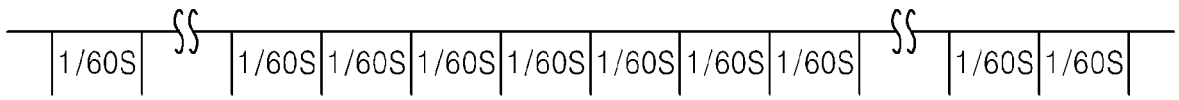
Figure 6:
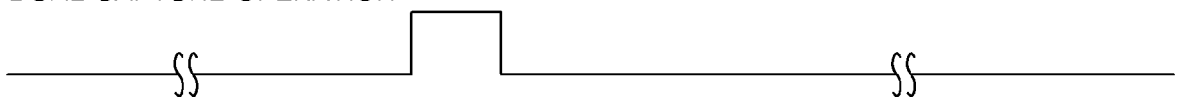
Figure 6:

FIG. 6 is a timing diagram for describing a method of generating content, according to another embodiment of the invention.

Looking at a difference between the methods of FIGS. 5 and 6, a moving image highlight of FIG. 6 only includes a time interval Tb before a point of time when a dual capture command is applied.

Figure 7:
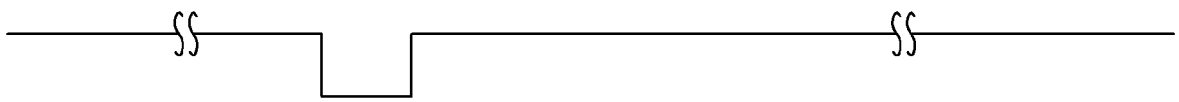
FIG. 7 is a timing diagram for describing a method of generating content, according to another embodiment of the invention.
Figure 7:
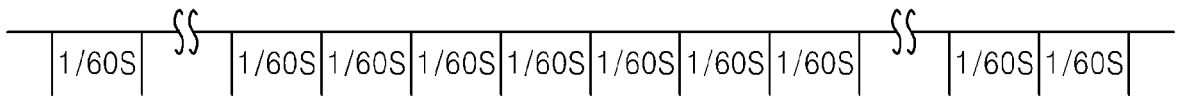
Figure 7:
Figure 7:
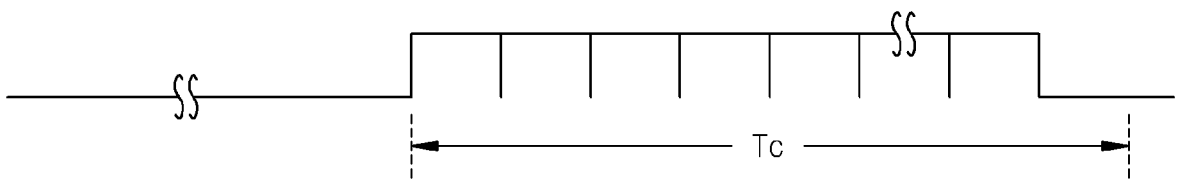

FIG. 7 is a timing diagram for describing a method of generating content, according to another embodiment of the invention.

Looking at a difference between the methods of FIGS. 5 and 7, a moving image highlight of FIG. 7 only includes a time interval Tc after a point of time when a dual capture command is applied.

Figure 8:
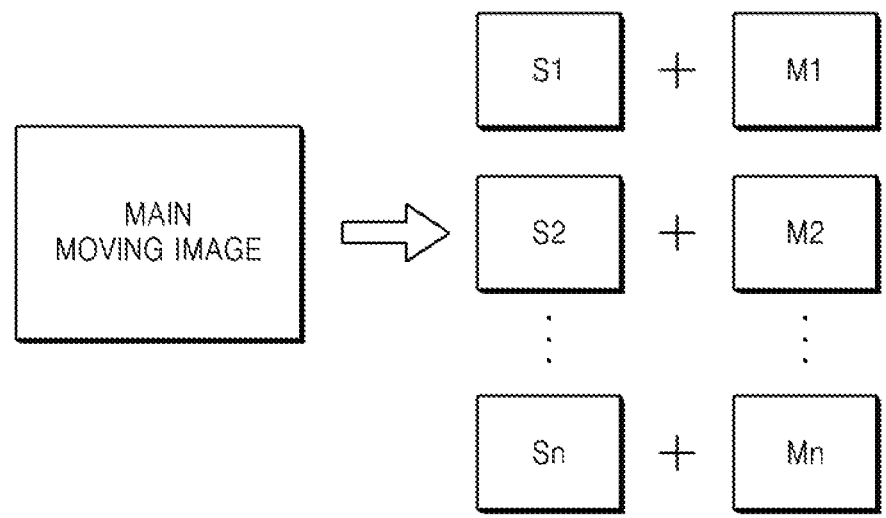
FIG. 8 is a block diagram for describing content generated according to an embodiment of the invention.

FIG. 8 is a diagram for describing content generated according to an embodiment of the invention.

Referring to FIG. 8, a main moving image is generated as first content, and dual capture images S1 through Sn are generated as second contents related to the main moving image. Also, while generating the dual capture images S1 through Sn, moving image highlights M1 through Mn are respectively generated as third contents related to the dual capture images S1 through Sn.

A main moving image, a dual capture image, and a moving image highlight may be stored as individual files. Also, it may be finally determined whether to generate the moving image highlight at a time when the capturing of the main moving image is ended. In other words, only the dual capture image may be generated, and the moving image highlight related to the dual capture image may not be generated. Generation of the moving image highlight may be individually determined according to moving image highlights.

As described above, the digital image processing apparatus 1 according to the current embodiment may generate a still image having a larger size (or higher resolution) than a moving image at a desired point of time while capturing the moving image, and may separately generate and reproduce a moving image highlight related to the still image.

Figure 9:
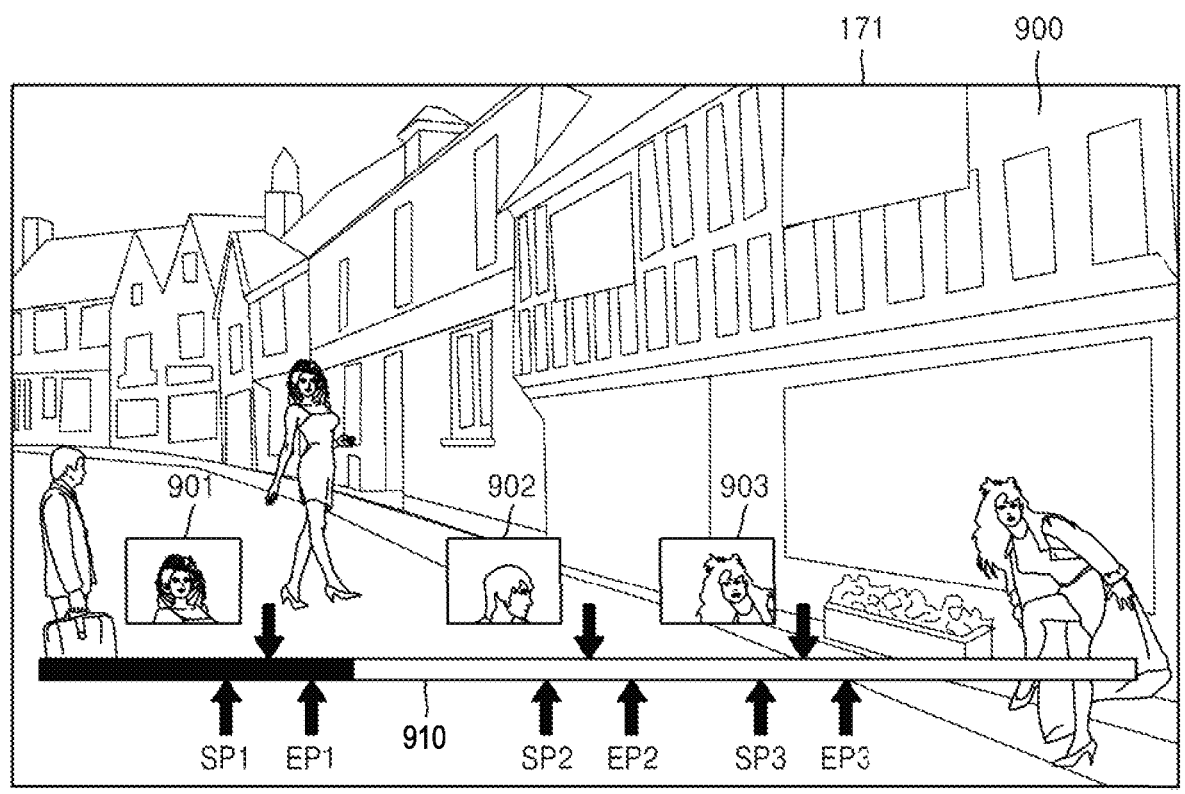
FIG. 9 is a pictorial diagram of a reproduction image of content generated according to an embodiment of the invention.

FIG. 9 is a diagram of a reproduction image of content generated according to an embodiment of the invention.

Referring to FIG. 9, when a stored moving image is reproduced, a moving image screen 900 is displayed on the display unit 171. Also, thumbnail images 901 through 903 respectively of dual capture images related to a moving image may also be displayed on a region, for example, at the bottom of the display unit 171.

A state bar 910 for indicating a current reproduction location from among an entire moving image, may be displayed on the display unit 171. A thumbnail image of a corresponding dual capture image may be disposed at a location where the dual capture image is captured on the state bar 910. The location where the dual capture image is captured is a temporal location, and the location of the dual capture image may be determined by using a pointer.

Also, when a moving image highlight related to the dual capture image is generated, the state bar 910 may display a time interval including the moving image highlight. A location of display of the time interval may be determined by using start pointers SP1 through SP3 and end pointers EP1 through EP3.

A pointer or metadata including a start pointer and an end pointer will now be described in detail.

In order to display a dual capture image and a moving image highlight, or information related to a main moving image as shown in FIG. 9 while reproducing the main moving image, it is required to record that images are related to each other. This is because a corresponding still image can be linked while reproducing a moving image when still images stored while capturing a corresponding moving image are identified.

Accordingly, the metadata should include file information about a main moving image, a dual capture image, and a moving image highlight. Here, the file information may be file names of the main moving image, the dual capture image, and the moving image highlight.

Also, the metadata includes time information about points of time when the main moving image, the dual capture image, and the moving image highlight are captured. The time information of the main moving image is information about a moving image capture start time. The time information of the dual capture image is information about a frame number in a moving image or a point of time when a dual capture command is applied. The time information of the moving image highlight is start and end times of the moving image highlight. Alternatively, the time information of the moving image highlight may be a frame number in the main moving image in the start and end times.

The file information and the time information may be managed by being included in the metadata, and the metadata may be managed using any one of various methods.

The metadata may be managed by storing the metadata in a header of the main moving image as extension metadata. Alternatively, the metadata may be included in a header of the dual capture image or moving image highlight. Alternatively, metadata in different ranges may be stored in each content. For example, metadata including all information about the main moving image, the dual capture image, and the moving image highlight may be recorded in the header of the main moving image, metadata including information about the dual capture image and the moving image highlight may be recorded in the header of the dual capture image, and metadata including information about the moving image highlight and the dual capture image may be recorded in the header of the moving image highlight.

Alternatively, the metadata may be managed by storing the metadata as a metafile separate from each content. Here, the metafile may be in one file including all metadata of the main moving image, the dual capture image, and the moving image highlight. Alternatively, the metafile may be generated and stored separately according to main moving images. In other words, each metafile may only include information about a dual capture image and a moving image highlight generated in relation to a corresponding main moving image.

Figure 10:
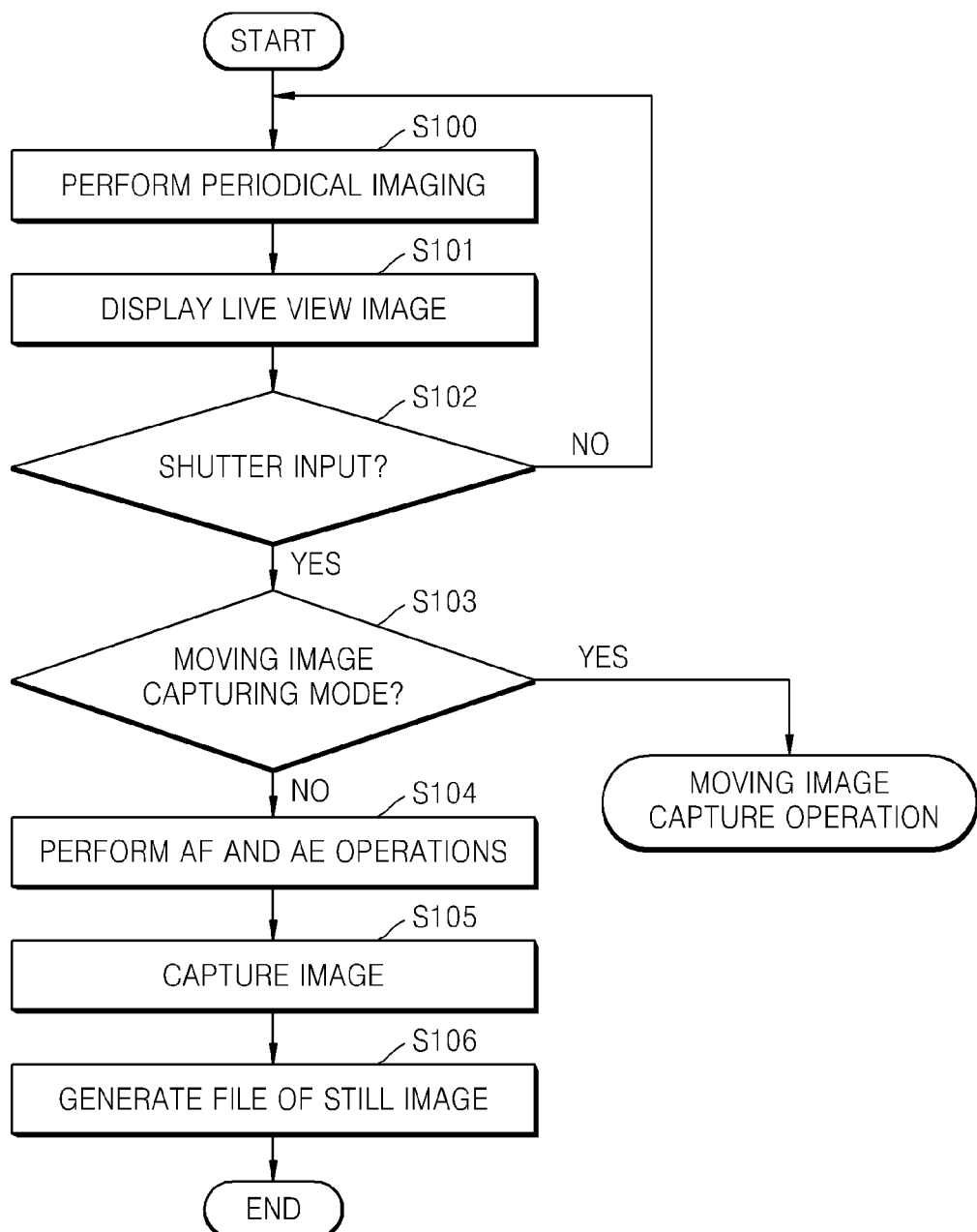
FIGS. 10 and 11 are flowcharts illustrating a method of controlling a digital image processing apparatus, according to an embodiment of the invention.
Figure 11:
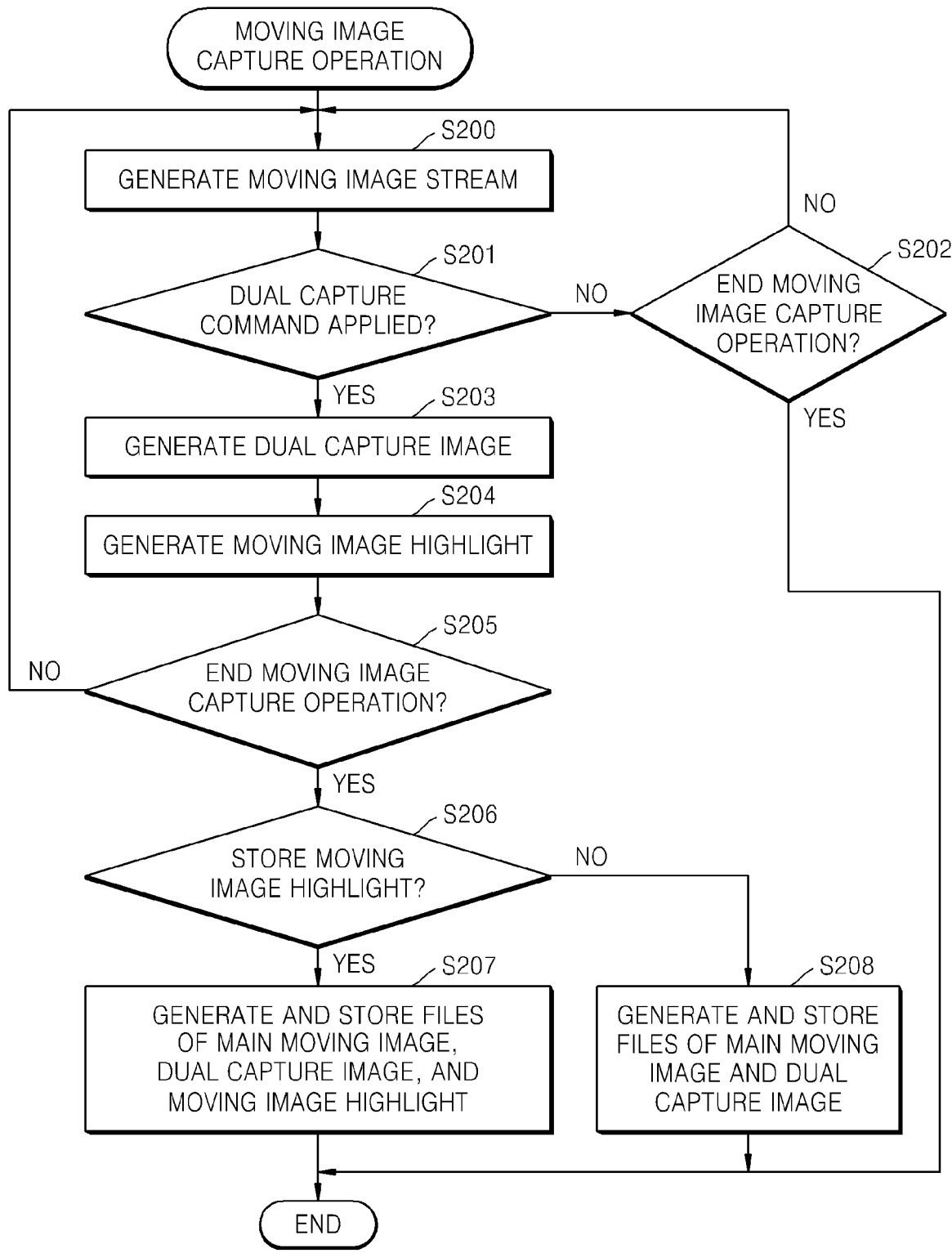

FIGS. 10 and 11 are flowcharts illustrating a method of controlling a digital image processing apparatus 1 of FIG. 1, according to an embodiment of the invention.

Referring to FIG. 10, when a capturing mode is started, periodical imaging is performed in the image pickup device in operation S100. An image signal generated via the periodical imaging is processed and then displayed on the display unit 171 as a live view image, in operation S101.

It is determined whether there is a shutter input by a user, i.e., whether a shutter release button is pressed in operation S102. If it is determined that there is no shutter input, operation S100 is performed to display the live view image. On the other hand, if it is determined that there is a shutter input, it is determined whether the digital image processing apparatus 1 is in a moving image capturing mode in operation S103.

If it is determined that the digital image processing apparatus 1 is not in the moving image capturing mode, it is determined that the digital image processing apparatus 1 is in a still image capturing mode, and thus auto focus (AF) and auto exposure (AE) operations are performed in operation S104, and an image is captured in operation S105. Then, various image signal processes are performed on the captured image, and then a file of a still image is generated in operation S106.

On the other hand, if it is determined that the digital image processing apparatus 1 is in the moving image capturing mode, a moving image capture operation is performed.

Referring to FIG. 11, when the moving image capture operation is started, a moving image stream is generated by using an ISP output in operation S200. Operation S200 is continuously performed until the moving image capture operation is ended.

It is determined whether a dual capture command is applied by a user while generating the moving image stream in operation S201, and if there is no dual capture command, operation S200 and operation S202 of determining whether to end the moving image capture operation are repeatedly performed.

On the other hand, if the dual capture command is applied while generating the moving image stream, a dual capture image is generated in operation S203. Then, a moving image highlight related to the dual capture image is generated in operation S204.

It is determined whether the moving image capture operation is ended in operation S205, and if the moving image capture operation is not ended, operations S200 through S204 are repeated. If it is determined that the moving image capture operation is ended in operation S205, it is determined whether to store the moving image highlight generated in relation to the dual capture image in operation S206.

If the moving image highlight is determined to be stored by the user, files of the main moving image, the dual capture image, and the moving image highlight are each generated and stored in operation S207. On the other hand, if the moving image highlight is determined to be not stored by the user, files of the main moving image and the dual capture image are each generated and stored in operation S208.

In the current embodiment, the storing of the moving image highlight is determined after the capturing of the main moving image is ended, but alternatively, files of all moving image highlights may be automatically generated and stored without a decision of the user. Alternatively, the generation of files of the moving image highlights may be determined in a batch or individually. Also, the generation of files may be determined not only with respect to the moving image highlight but also the dual capture image.

Figure 12:
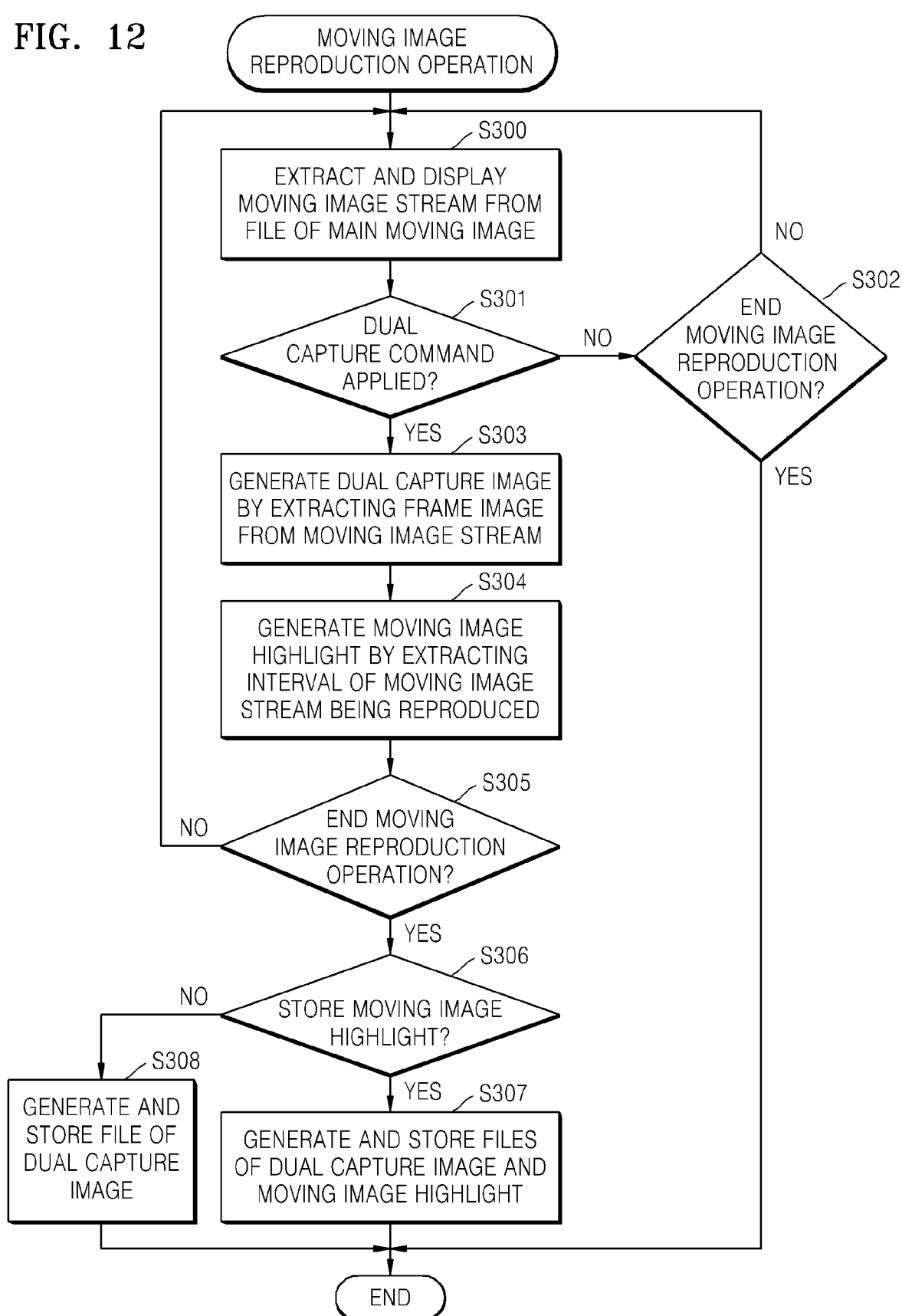
FIG. 12 is a flowchart illustrating a method of controlling a digital image processing apparatus, according to another embodiment of the invention.

FIG. 12 is a flowchart illustrating a method of controlling the digital image processing apparatus 1 of FIG. 1, according to another embodiment of the invention.

Referring to FIG. 12, a moving image reproduction operation is performed by extracting and displaying a moving image stream from a selected file of a main moving image in operation S300. A moving image is continuously reproduced until the moving image reproduction operation is ended.

While reproducing the moving image, it is determined whether a dual capture command is applied by a user in operation S301, and if the dual capture command is not applied, operation S300 and operation S302 of determining whether to end the moving image reproduction operation are repeatedly performed.

If the dual capture command is applied while reproducing the moving image, a dual capture image is generated by extracting a frame image from the moving image stream in operation S303. Here, a maximum resolution of the dual capture image is a resolution of the moving image being reproduced because unlike a dual capture image generated while capturing a moving image, an obtainable maximum resolution of the dual capture image generated at this time is the resolution of the moving image being reproduced.

Next, a moving image highlight related to the dual capture image is generated by extracting an interval of the moving image stream being reproduced in operation S304.

It is determined whether the moving image reproduction operation is ended in operation S305, and if not, operations S300 through S304 are repeated. If it is determined that the moving image reproduction operation is ended in operation S305, it is determined whether to store the moving image highlight generated by the dual capture command in operation S306.

If it is determined to store the moving image highlight by the user, files of the dual capture image and the moving image highlight are additionally respectively generated and stored in operation S307. On the other hand, if it is determined not to store the moving image highlight by the user, only a file of the dual capture image is additionally generated and stored in operation S308.

In the current embodiment, the storing of the moving image highlight is determined after the reproducing of the main moving image is ended, but alternatively, generating of files of the dual capture image and the moving image highlight may be determined in any method as described above.

Figure 13:
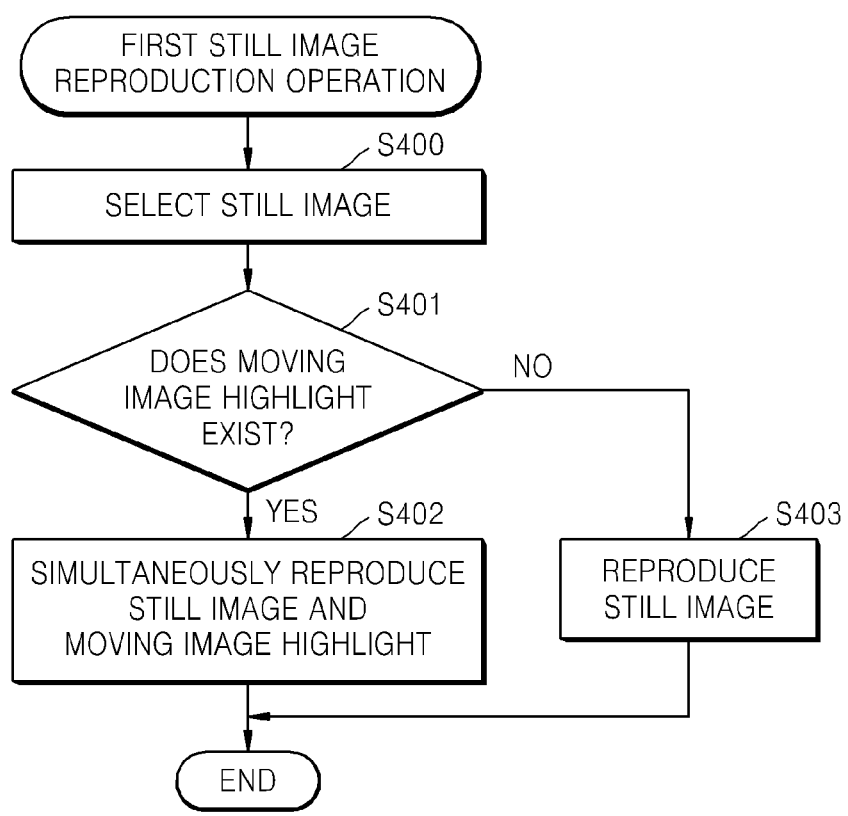
FIG. 13 is a flowchart illustrating a method of controlling a digital image processing apparatus, according to another embodiment of the invention.

FIG. 13 is a flowchart illustrating a method of controlling the digital image processing apparatus 1 of FIG. 1, according to another embodiment of the invention.

Referring to FIG. 13, when a still image is selected by a user in operation S400, it is determined whether a moving image highlight related to the selected still image exists in operation S401.

If it is determined that the moving image highlight related to the selected still image as a dual capture image exists, the still image and the moving image highlight are simultaneously reproduced in operation S402. For example, the still image may be reproduced throughout a screen, and the moving image highlight may be reproduced in a small size on a partial area of the display unit 171. On the other hand, the moving image highlight may be reproduced throughout a screen, and the still image may be reproduced in a small size on a partial area of the display unit 171.

Meanwhile, if it is determined that the moving image highlight related to the selected still image does not exist in operation S401, only the still image is reproduced in operation S403.

Figure 14:
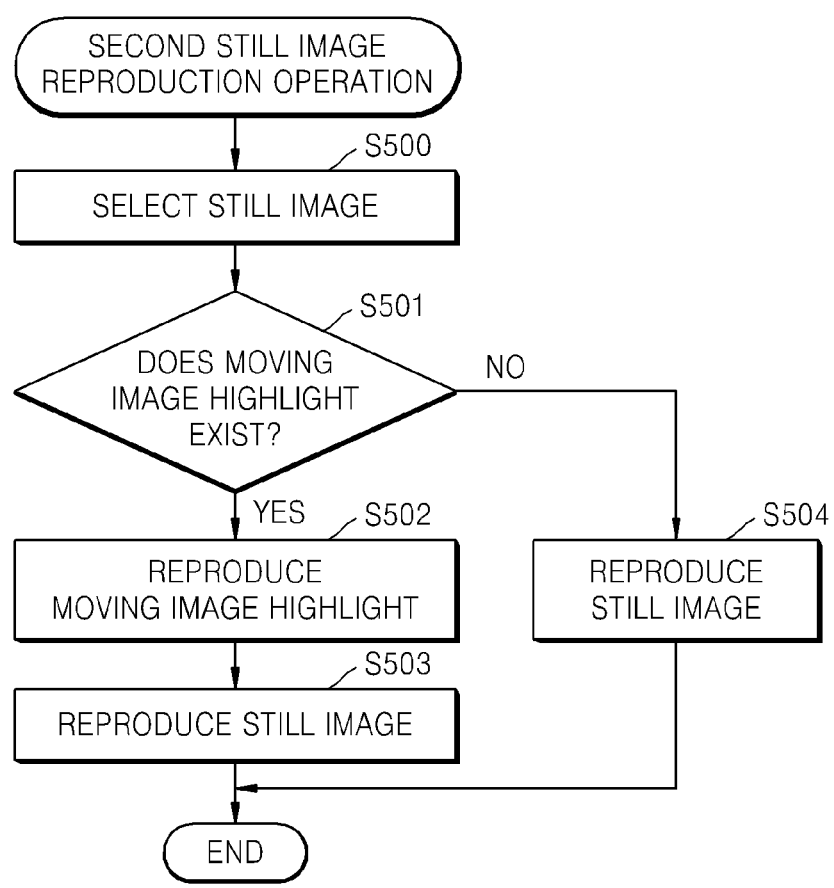
FIG. 14 is a flowchart illustrating a method of controlling a digital image processing apparatus, according to another embodiment of the invention.

FIG. 14 is a flowchart illustrating a method of controlling the digital image processing apparatus 1 of FIG. 1, according to another embodiment of the invention. The method of FIG. 14 is different from the method of FIG. 13 in terms of reproducing of a moving image highlight, and only this difference will be described.

Referring to FIG. 14, if it is determined that the moving image highlight related to the selected still image as a dual capture image exists in operation S501, the moving image highlight is first reproduced in operation S502. Then, when the reproducing of the moving image highlight is ended, the selected still image is reproduced in operation S503.

Figure 15:
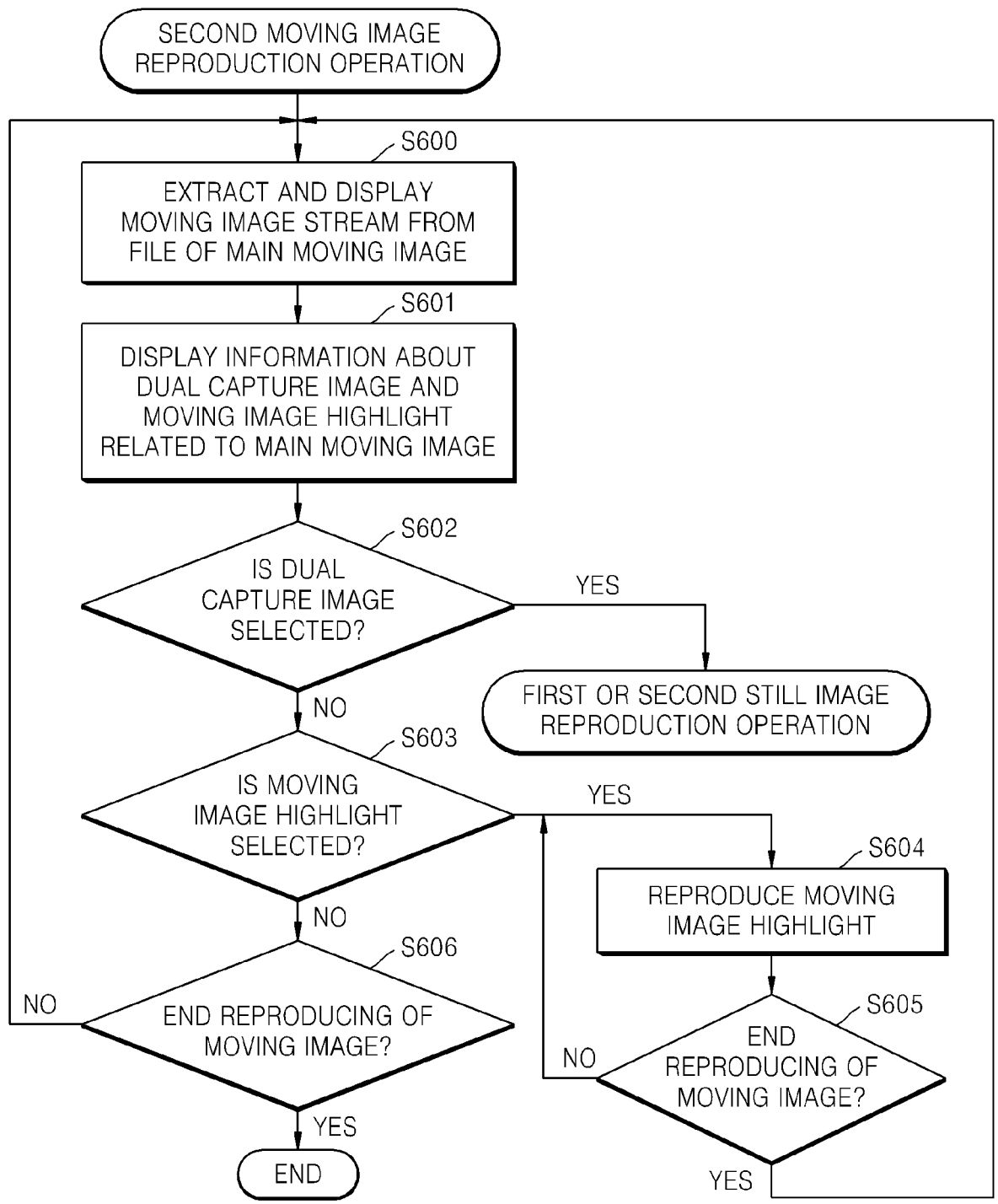
FIG. 15 is a flowchart illustrating a method of controlling a digital image processing apparatus, according to another embodiment of the invention.

FIG. 15 is a flowchart illustrating a method of controlling the digital image processing apparatus 1 of FIG. 1, according to another embodiment of the invention. In the current embodiment, a main moving image, of which a dual capture image and a moving image highlight are generated, is selected as a moving image.

Referring to FIG. 15, the moving image is reproduced by extracting and displaying a moving image stream from a selected file of a main moving image in operation S600. The moving image is continuously reproduced until a moving image reproduction operation is ended.

Then, information about a dual capture image and a moving image highlight related to the main moving image are displayed together in operation S601. For example, the information may be a pointer indicating a point of time when the dual capture image is captured from the main moving image being reproduced or a pointer indicating an interval where the moving image highlight is captured. The information may be displayed by extracting file information or time information from metadata recorded on a header region of the main moving image or separate metadata.

Then, it is determined whether the dual capture image displayed with the main moving image is selected by the user while reproducing the main moving image in operation S602. If the dual capture image is selected, a still image is reproduced as described with reference to FIGS. 13 and 14. Although not illustrated, the dual capture image may be temporarily reproduced, and then the main moving image may be reproduced again after a predetermined time.

Also, it is determined whether the moving image highlight is selected by the user while reproducing the main moving image, in operation S603. If the moving image highlight is selected, the selected moving image highlight is reproduced in operation S604, and then it is determined whether to end the reproducing of the moving image in operation S605. Then, when the reproducing of the moving image highlight is ended, the main moving image is reproduced again.

If no content is selected in operations 602 and S603, the main moving image is reproduced while determining whether the reproducing of the moving image is ended in operation S606. If it is determined that the reproducing of the main moving image is not ended, operation S600 is performed.

As described above, the digital image processing apparatus 1 according to the current embodiment may generate a still image having a larger size (or higher resolution) than a moving image at a point of time desired by the user while capturing the moving image, and separately generate and reproduce a moving image highlight related to the still image.

According to the embodiments of the invention, the digital image processing apparatus can satisfy diversified tastes of users by variously manufacturing additional contents related to moving images.

The invention can also be embodied as computer readable codes on a computer readable recording medium. The computer readable recording medium is any non-volatile data storage device that can store data which can be thereafter read by a computer system.

The computer readable codes are configured to perform operations for realizing a method a method of controlling a digital image processing apparatus according to the invention when read and executed by a processor (for example, the CPU/DSP 120) from the computer readable recording medium. The computer readable codes may be realized in various programming languages. Also, functional programs, codes, and code segments for accomplishing the invention can be easily construed by programmers skilled in the art to which the invention pertains.

Examples of the computer readable recording medium include read-only memory (ROM), random-access memory (RAM), CD-ROMs, magnetic tapes, floppy disks, optical data storage devices, etc. The computer readable recording medium can also be distributed over network coupled computer systems so that the computer readable code is stored and executed in a distributed fashion.

All references, including publications, patent applications, and patents, cited herein are hereby incorporated by reference to the same extent as if each reference were individually and specifically indicated as incorporated by reference and were set forth in its entirety herein.

The embodiments herein may be described in terms of functional block components and various processing steps. Such functional blocks may be realized by any number of hardware and/or software components that perform the specified functions. For example, the described embodiments may employ various integrated circuit components, e.g., memory elements, processing elements, logic elements, look-up tables, and the like, which may carry out a variety of functions under the control of one or more microprocessors or other control devices. Functional aspects may be implemented in algorithms that execute on one or more processors. Furthermore, the embodiments of the invention could employ any number of conventional techniques for electronics configuration, signal processing and/or control, data processing and the like.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings. Expressions such as "at least one of," when preceding a list of elements, modify the entire list of elements and do not modify the individual elements of the list.

The steps of all methods described herein are performable in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. The words "mechanism" and "element" are used herein generally and are not limited solely to mechanical embodiments.

While this invention has been particularly shown and described with reference to embodiments thereof, it will be understood by those of ordinary skill in the art that various changes in form and details may be made therein without departing from the spirit and scope of the invention as defined by the appended claims. The embodiments should be considered in a descriptive sense only and not for purposes of limitation. Therefore, the scope of the invention is defined not by the detailed description of the invention but by the appended claims, and all differences within the scope will be construed as being included in the invention.

What is claimed is:

1. An electronic device comprising:
   a display;
   an image sensor;
   a first memory;
   a second memory; and
   one or more processors configured to:
      while obtaining an image signal from the image sensor, control the display to display a preview image, and store a plurality of images temporarily in the first memory based on the image signal;
      while displaying the preview image, in response to a first user input for capturing images, store a moving image as a file in the second memory, the moving image comprising:
         a first plurality of images corresponding to a first predetermined time interval before a time point of the first user input obtained from the plurality of images temporarily stored in the first memory,
         an image corresponding to the time point of the first user input, and
         a second plurality of images corresponding to a second predetermined time interval after the time point of the first user input, and
      in response to a second user input for displaying images of the file in the second memory, control the display to display the moving image stored in the file, and to display the image corresponding to the time point of the first user input following the display of the moving image.

2. The electronic device of claim 1, wherein the one or more processors are further configured to maintain at least one image obtained from the image sensor for a predetermined interval in the first memory.

3. The electronic device of claim 1, wherein the image corresponding to the time point of the first user input is different from a starting frame of the moving image.

4. The electronic device of claim 1, wherein the second user input comprises a single selection of an object corresponding to the file.

5. The electronic device of claim 1, wherein the file comprises information about the moving image.

6. The electronic device of claim 1, wherein the file comprises time information about a time point corresponding to a starting frame of the moving image, and a time point of the first input.

7. A method of controlling an electronic device, comprising:
   while obtaining an image signal from the image sensor, displaying a preview image;
   storing a plurality of images temporarily in a first memory based on the image signal;
   while displaying the preview image, in response to a first user input for capturing images, storing a moving image as a file in a second memory, the moving image comprising:
      a first plurality of images corresponding to a first predetermined time interval before a time point of the first user input obtained from the plurality of images temporarily stored in the first memory,
      an image corresponding to the time point of the first user input, and
      a second plurality of images corresponding to a second predetermined time interval after the time point of the first user input, and
   in response to a second user input for displaying images of the file in the second memory, displaying the moving image stored in the file, and displaying the image corresponding to the time point of the first user input following the display of the moving image.

8. The method of claim 7, further comprising maintaining at least one image obtained from the image sensor for a predetermined interval in the first memory.

9. The method of claim 7, wherein the image corresponding to the time point of the first user input is different from a starting frame of the moving image.

10. The method of claim 7, wherein the second user input comprises a single selection of an object corresponding to the file.

11. The method of claim 7, wherein the file comprises information about the moving image.

12. The method of claim 7, wherein the file comprises time information about a time point corresponding to a starting frame of the moving image, and a time point of the first input.

13. A non-transitory computer-readable storage medium storing a computer program comprising instructions for performing a method of controlling an electronic device when the computer program is executed by a processor, the method comprising:
   while obtaining an image signal from the image sensor, displaying a preview image;
   storing a plurality of images temporarily in a first memory based on the image signal;
   while displaying the preview image, in response to a first user input for capturing images, storing a moving image as a file in a second memory, the moving image comprising:
      a first plurality of images corresponding to a first predetermined time interval before a time point of the first user input obtained from the plurality of images temporarily stored in the first memory,
      an image corresponding to the time point of the first user input, and
      a second plurality of images corresponding to a second predetermined time interval after the time point of the first user input, and
   in response to a second user input for displaying images of the file in the second memory, displaying the moving image stored in the file, and displaying the image corresponding to the time point of the first user input following the display of the moving image.

* * * * *